Figure 1:
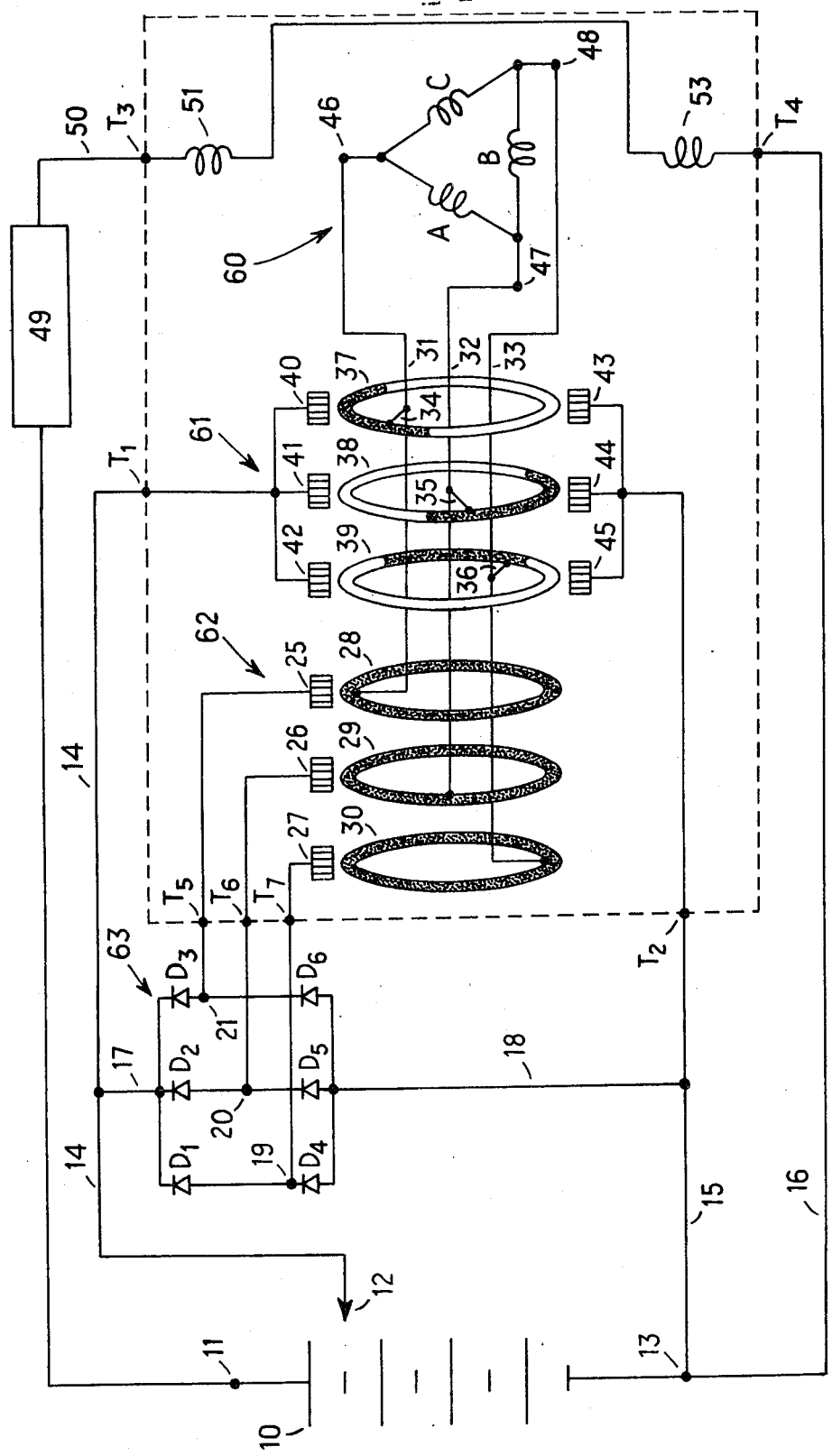

United States Patent [19]
Salihi

[11] 3,906,321
[45] Sept. 16, 1975

[54] DIRECT CURRENT MOTORS

[76] Inventor: Jalal Tawfiq Salihi, 20 Kahdena Rd., Morristown, N.J. 07960

[22] Filed: Oct. 15, 1973

[21] Appl. No.: 406,677

[52] U.S. Cl. ............................ 318/439; 318/492
[51] Int. Cl. ..................................... H02k 13/00
[58] Field of Search .......... 318/138, 254, 439, 492; 310/219, 222

[56] References Cited
UNITED STATES PATENTS

| | | |
|---|---|---|
| 3,025,443 | 3/1962 | Wilkinson et al. ............... 318/254 X |
| 3,530,347 | 9/1970 | Newel ................................. 318/138 |
| 3,600,658 | 8/1971 | Kuniyoshi ........................... 318/439 |
| 3,662,237 | 5/1972 | Favre .................................. 318/254 |

*Primary Examiner*—G. Z. Rubinson

[57] ABSTRACT

This invention relates to improved direct current motors where an auxiliary path is provided for the flow of reactive energy associated with motor winding inductances during fast changes in current. These changes occur while the brushes move from one commutator segment to another during motor rotation. The auxiliary path limits the induced voltage automatically to a predetermined maximum value thus allowing higher motor speed, higher power density and longer life.

5 Claims, 10 Drawing Figures

DIRECT CURRENT MOTORS

Several direct current motor systems using an auxiliary path for reactive energy to overcome commutation problems have been described in a previous patent application (Ser. No. 322219, filed Jan. 9, 1973, Salihi). Also the effect of the auxiliary path and the theory of its operation have been described in detail.

The present patent application describes other possible direct current motor systems using the same principle for handling the reactive energy and overcoming commutation problems.

One of the most important limiting factors on satisfactory operation of direct current machines is the ability to transfer the necessary armature current through the brush contact at the commutator without sparking and without excessive local losses and heating of the brushes and commutator. Sparking causes destructive blackening, pitting, and wear of both commutator and brushes. These conditions progressively become worse and lead to burning away of the copper and carbon. Also the commutation problem becomes more severe as the speed of the motor increases and when the torque (current) at a given speed increases. Consequently, this phenomenon limits the speed and the horsepower that can be obtained safely from a given machine size.

The natural path for the reactive energy provided by the auxiliary circuit of the motor systems described in this invention suppresses the induced voltage associated with the motor winding inductances automatically to safe values, thus overcoming the limitations on motor speed and torque imposed by commutation problems in conventional DC machines and allowing the same size machine to operate at higher speed and current (torque) levels. This means higher horsepower for the same machine size in addition to a longer operating life. This invention also allows more flexibility in designing simpler motor winding configurations and a wider choice for the selection of commutator geometry and brush materials.

Accordingly, it is the object of the present invention to provide commutator DC motor systems operating from a DC voltage source where in addition to conventional motor components, that is, the field, armature, commutator and associated brushes, an auxiliary circuit is added which consists mainly of a combination of diodes and slip rings. This circuit provides a ready path for the flow of reactive energy so as to limit the maximum value of the induced voltage in the motor windings during sudden changes in current.

A further object of this invention is to make use of the flexibility in motor design realized by the addition of the auxiliary circuit to design motors with less number of windings and commutator segments and with simpler winding configurations.

Still another object of this invention is to make further use of the flexibility offered to expand the operating range of the motor to incorporate a wider range of current, torque, voltage, speed and consequently a higher horsepower per unit weight.

Additional objects and advantages of the present invention will be apparent from the following description wherein the figures listed below are incorporated as illustrating a preferred embodiment.

In the drawings:

FIG. 1. Is a schematic diagram illustrating one version of this invention where an auxiliary path for reactive energy is incorporated in a two pole separately excited direct current motor.

Figure 2:
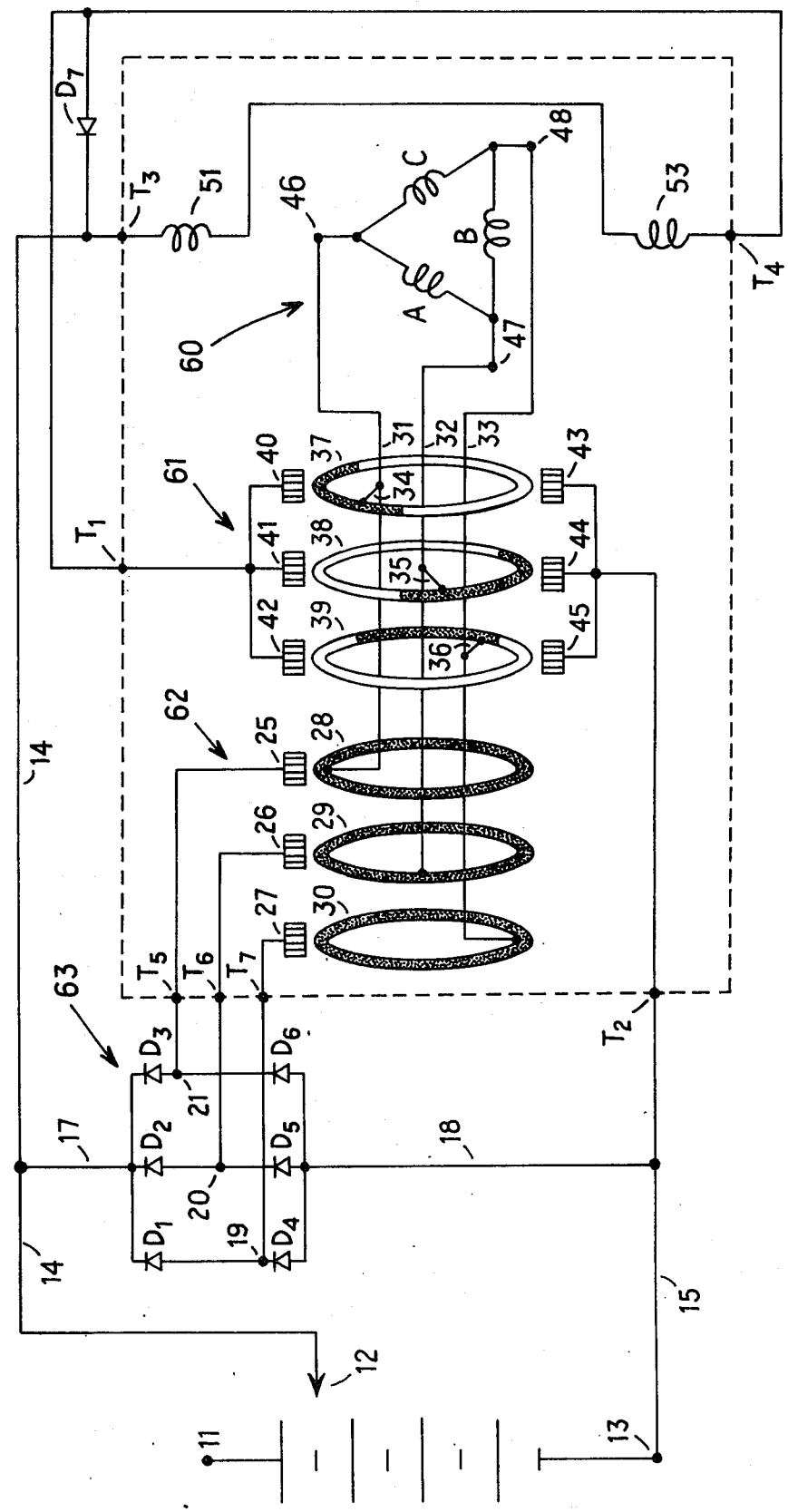

FIG. 2. Is a schematic diagram illustrating a second version of this invention where an auxiliary path for reactive energy is incorporated in a two pole series direct current motor.

Figure 3:
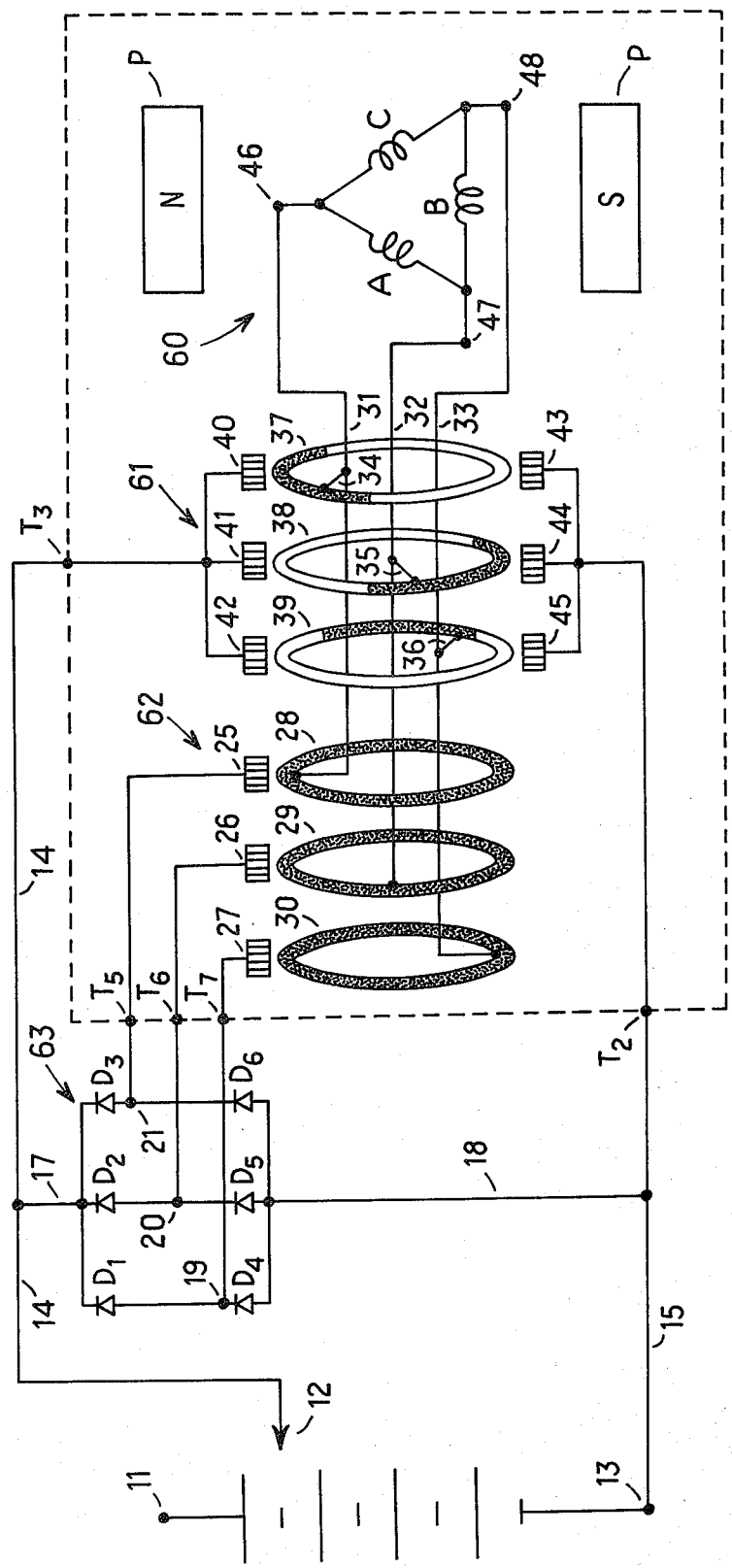

FIG. 3. Is a schematic diagram illustrating a third version of this invention where an auxiliary path for reactive energy is incorporated in a two pole permanent magnet direct current motor.

FIG. 4. Is a simplified schematic diagram used to illustrate some possible variations in commutator and brush arrangements used in the motor systems of FIGS. 1, 2, 3.

FIG. 5. Shows a block diagram representation of the motor systems of FIGS. 1 and 2, and some modification of these systems.

Figure 6:
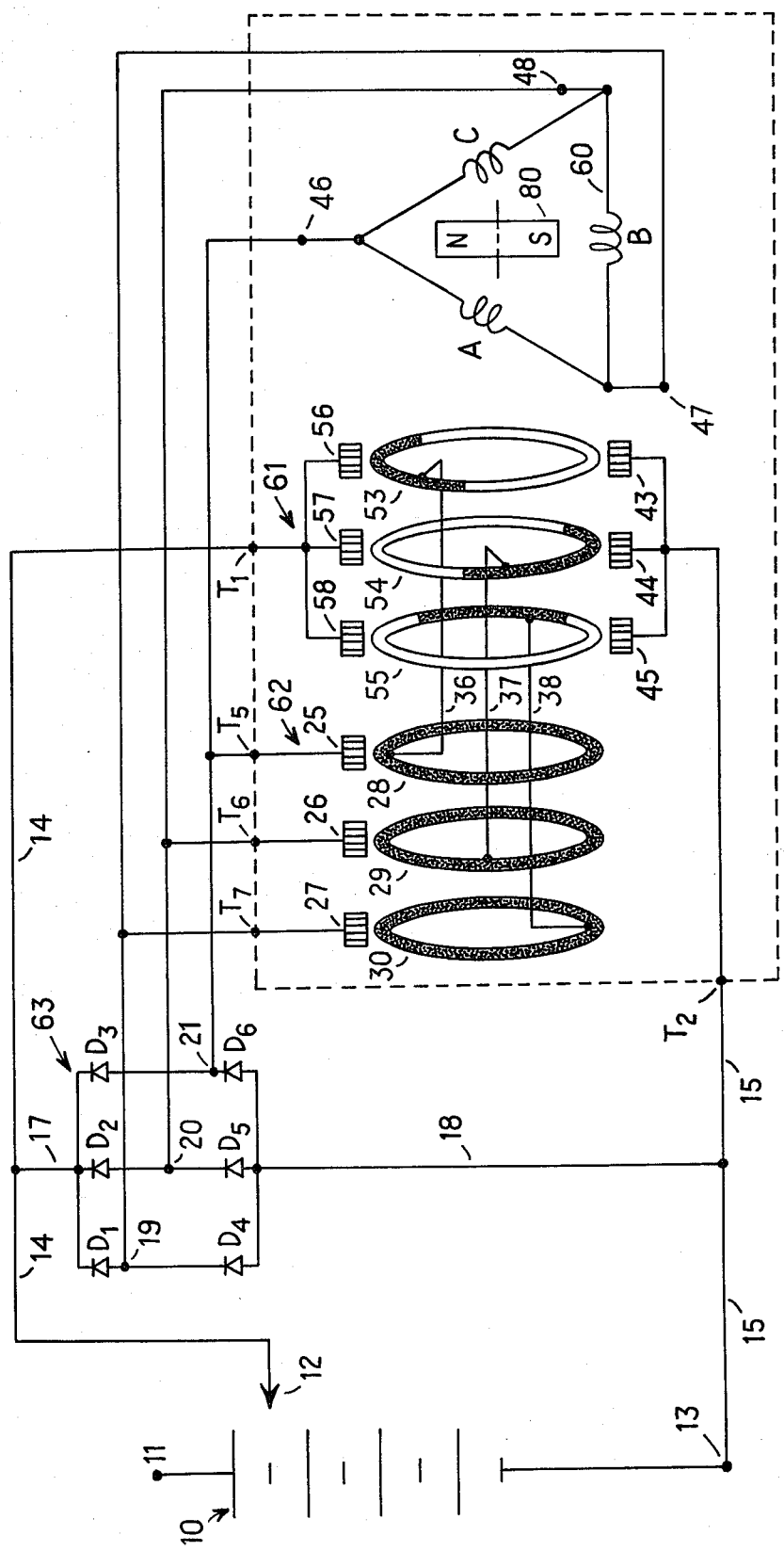

FIG. 6. Is a schematic diagram illustrating another version of this invention similar to the permanent magnet direct current motor system of FIG. 3, except for using a rotating permanent magnet and a stationary armature winding compared to a stationary permanent magnet and a rotating armature winding used in FIG. 3.

Reference to be made to the drawings and more particularly to FIG. 1, which shows the schematic diagram of a two pole separately excited direct current motor system of this invention. More specifically the motor system consists essentially of stationary field windings 51, 53, rotating armature windings 60, rotating commutator 61 and associated stationary brushes, three rotating slip rings 62 and associated stationary brushes, and a full wave bridge rectifier 63.

The armature winding 60, consists of three windings A, B, C connected in delta. The commutator consists of three rotating rings 37, 38, 39 and two sets of diametrically opposite brushes designated by 40, 41, 42 in the first set and 43, 44, 45 in the second set. The commutator rings are identical in design, each having an electrically conductive segment of preferably 120° shown shaded with the rest of the surface being nonconductive. As shown in FIG. 1, the conductive segment of the three commutator rings are displaced exactly by 120° with respect to the conductive segments of the other two commutator rings leading one by 120° and lagging the other by 120°.

The three terminals of the armature windings designated by the reference numerals 46, 47, 48, are connected to the conducting segments of the corresponding commutator rings 37, 38, 39, by conductors 31, 34 - 32, 35 - 33, 36 respectively.

The DC voltage source feeds the armature winding through a voltage controller, (represented for the purpose of simplification by the movable tap 12), conductor 14, brushes 40, 41, 42, conducting segments of the commutator rings 37, 38, 39, armature winding, conducting segments of commutator rings 37, 38, 39, brushes 43, 44, 45, conductor 15, negative terminal of the DC voltage source designated by the reference numeral 13.

The DC voltage source feeds the field windings through the positive terminal of the DC power source designated by the reference numeral 11, the field controller 49, conductor 50, field winding 51, conductor 52, field winding 53, conductor 16, and the negative terminal of the DC voltage source designated by the reference numeral 13.

The auxiliary path for reactive energy is provided essentially by the slip rings and the full wave bridge rectifier. The three slip rings and associated three brushes are designated by the reference numerals 28, 29, 30, and 25, 26, 27, respectively. Each brush is in electrical contact with the associated slip ring over the entire surface of the ring. The slip rings 28, 29, 30, are connected to terminals 46, 47, 48, of the armature winding by conductors 31, 32, 33, respectively.

The bridge rectifier consists of six diodes $D_1$, $D_2$, $D_3$, $D_4$, $D_5$, $D_6$. The junction point of diodes $D_1$, $D_2$, $D_3$ is connected through conductor 17 and 14 to the movable tap 12 of the DC voltage source. The junction point of diodes $D_4$, $D_5$, $D_6$ is connected through conductors 18 and 15 to the negative terminal 13 of the DC voltage source. The junction points of diodes $D_3D_6$, $D_2D_5$ and $D_1D_4$ are connected to the slip ring brushes 25, 26, 27, respectively.

The equivalent circuit of the motor system of FIG. 1 is identical to the equivalent circuit given in the previous patent application (Ser. No. 322219, filed Jan. 9, 1973, Salihi). The principle of operation of the motor system of FIG. 1 of the present patent application and the effect of the auxiliary path in overcoming commutation problems are therefore similar to those described in the previous patent application.

FIG. 2, is a schematic diagram illustrating a second version of this invention where an auxiliary path for reactive energy is incorporated in a two pole series direct current motor. In this motor system the armature and field are connected in series and are fed from the DC voltage source through a voltage controller (represented for the purpose of simplification by the movable tap 12), conductor 14, field winding 51, conductor 52, field winding 53, conductor 16, commutator brushes 40, 41, 42, conducting segments of commutator rings 37, 38, 39, armature winding, conducting segment of commutator segments 37, 38, 39, commutator brushes 43, 44, 45, conductor 15, and negative terminal of the DC voltage source designated by the reference numeral 13. Also a freewheeling diode $D_7$ is connected across the field to provide a path for the field current during interuptions of the field by the commutor which may occur in cases where the conductive segments of the commutators are appreciably less than 120 degrees. Except for these differences, the motor system of FIG. 2 and FIG. 1 are similar, where same reference numerals are used to designate similar components.

FIG. 3, is a schematic diagram illustrating a third version of this invention, where an auxiliary path for reactive energy is incorporated in a two pole permanent magnet direct current motor. Except for the replacement of the field windings by permanent magnets P, the motor system of FIG. 3, is identical to the motor system of FIG. 1, where same reference numerals are used to designate identical components. Also, the function of the auxiliary path for reactive energy are identical in the two motor systems.

Figure 4B:
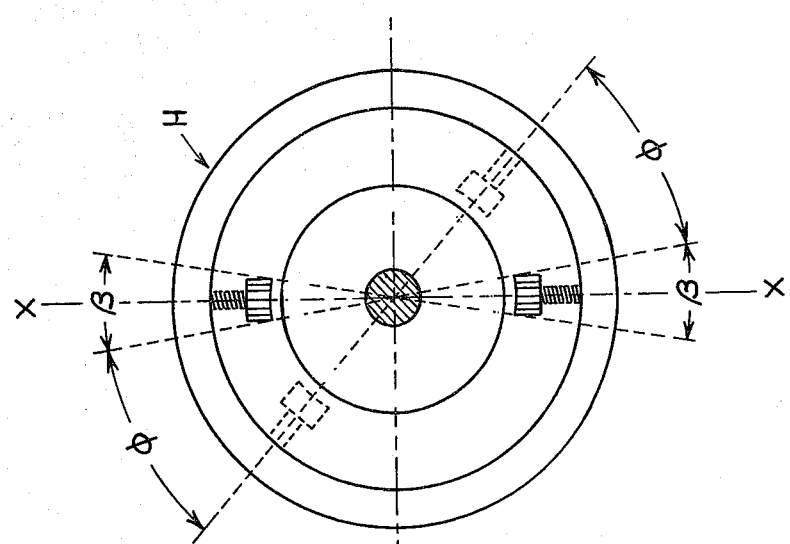
Figure 4A:
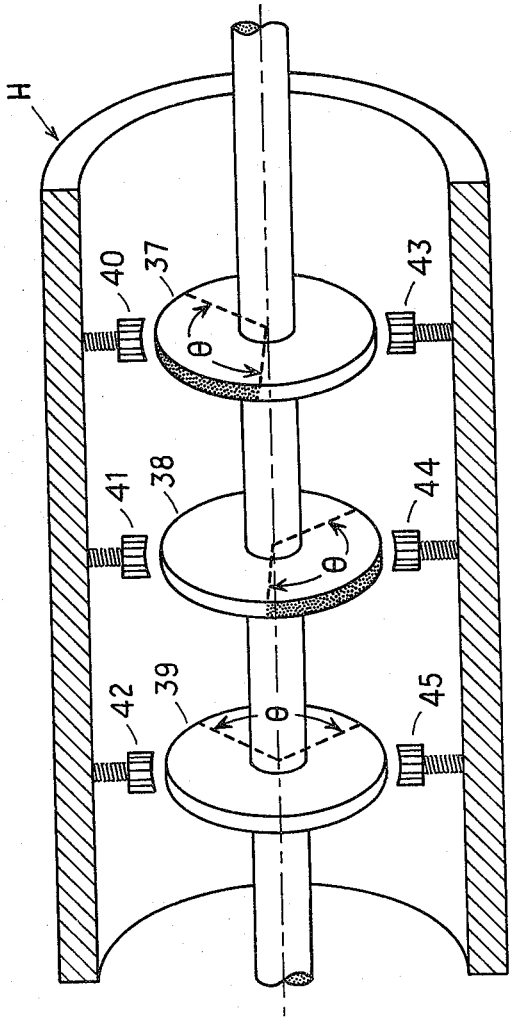

FIG. 4, shows more details of the commutator used in the motor system of FIGS. 1, 2, and 3. FIG. 4a depicts a simplified three dimensional view of the commutator and FIG. 4b depicts a side view of the commutator. As mentioned above, the commutator consists of three rotating rings 37, 38, 39 mounted on the motor shaft and two sets of stationary brushes, each set comprising of three brushes designated by the reference numerals 40, 41, 42 and 43, 44, 45 respectively.

The three commutator rings are identical in design, each having an electrically conductive segment of angular width ($\theta$) shown shaded and the rest of the surface being non-conductive. The three conductive segments of commutator are displaced by 120° exactly with respect to the other two segments leading one by 120° and lagging the other by 120°.

All brushes are mechanically mounted and supported by a brush holder assembly designated by the letter H such that the two sets of three brushes are pressed on diametrically opposite sides of the commutator rings as shown in FIG. 4. The brush holder assembly includes appropriate isolation for the individual brushes, and includes appropriate mechanism to shift the total brush system by any desired angle ($\phi$) to either side of the designed operating axis (XX) shown in FIG. 4. That is, a lead or lagging brush position relative to the designed axis can be obtained to optimize the motor performance.

Although an angular width $\theta = 120°$ was specified for the conductive segments of the commutator rings of the motor system of FIG. 1, other angular widths slightly different than 120° can be used to improve motor operation. The optimum width of the segments are determined by several factors including the angular span of the commutator brushes designated by ($\beta$) in FIG. 4, material of the brushes, motor winding design and other factors.

It is noted that the simplified schematic representation of the commutator and associated brush holder assembly of FIG. 4, is intended only for the purpose of illustrating the principle of operation and should not be interpreted in any way to indicate a preferred design or actual location of components. Several types of brush holder configurations known to those skilled in the art can be used.

Though the principal of this invention has been so far applied to three specific direct current motor systems, this in no way is meant to restrict the application of the principle to other types of direct current motor sytems. For example, in each of the three motor systems described, a star connected armature winding can be used instead of the specified delta connected winding. Also, each of the motor systems can operate as a generator where the auxiliary path for reactive energy overcome commutation problems in a manner similar to motor operation.

Other possible modifications of the motor systems described are given in FIG. 5. Where FIG. 5a, shows a simplified block diagram of the separately excited direct current motor system of FIG. 1, using identical numeral and letters to designate identical components. FIG. 4b, is a modification of this motor system where a chopper designated by the reference numeral 70 is used to transform the fixed DC voltage source to a smoothly variable DC voltage applied to the motor. Several types of choppers described in literature can be used (for example the chopper described in U.S. Pat. No. 3,524,079, Aug. 11, 1970). The diode $D_8$, is necessary to by-pass the chopper and provide a path for reactive energy delivered by the auxiliary circuit. This can also be achieved, as shown by the dotted path, by connecting conductor 17 directly to the positive terminal of the DC power source designated by the reference numeral 11.

Figure 5C:
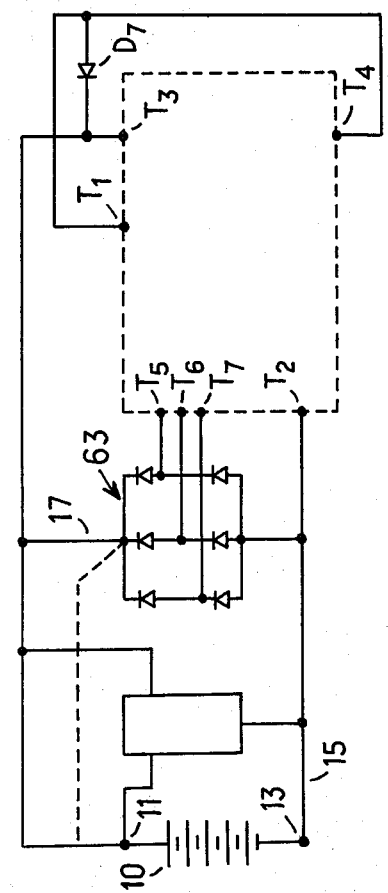
Figure 5D:
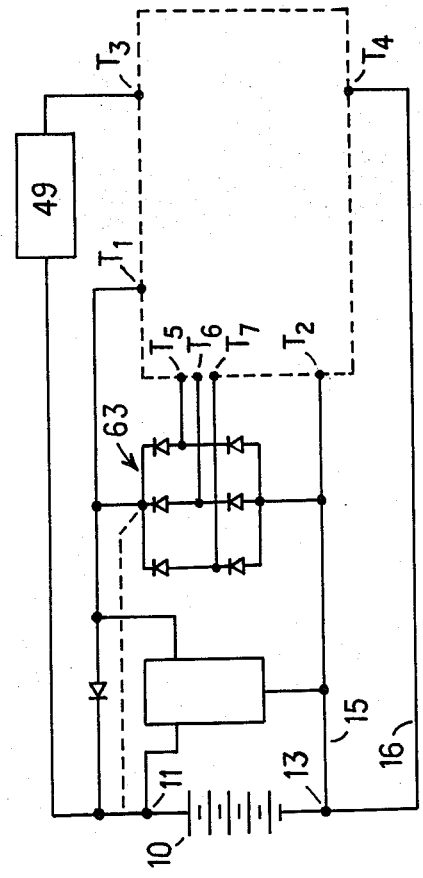
Figure 5A:
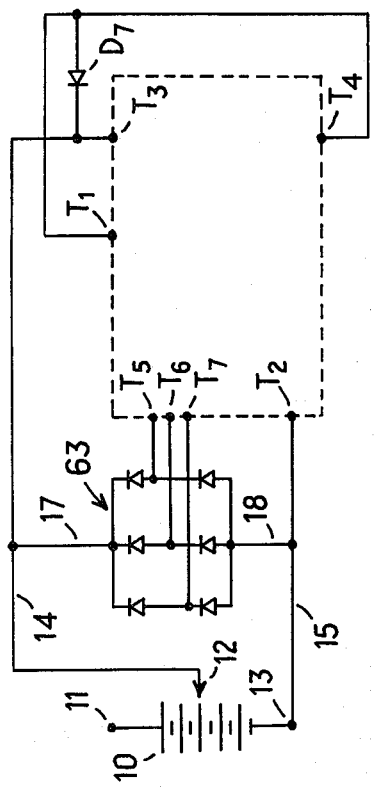
Figure 5B:
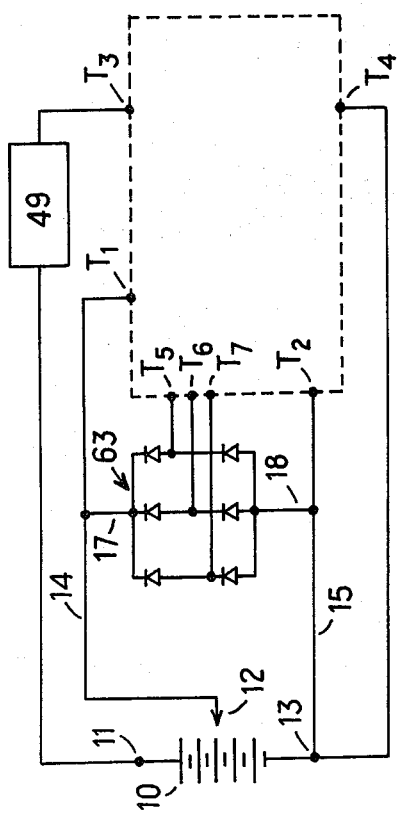

Similarly, FIG. 5c shows a simplified representation of the direct current series motor system of FIG. 2, where identical numerals and letters are used to designate identical components. FIG. 5d is a modification of this motor system where a chopper designated by the reference numeral 70 is used to transform the fixed DC voltage source to a variable DC voltage applied to the motor. The function of the diode $D_R$ and the alternate dotted path shown is to provide a pass for reactive energy in a manner similar to FIG. 5b.

FIG. 6 is a schematic diagram illustrating another version of this invention which is a modification of the permanent magnet direct current motor system of FIG. 3, described above. In this modified version a rotating permanent field magnet and a stationary armature winding is used compared with a stationary permanent field magnet and a rotating armature winding used in the motor system of FIG. 3. The rotating permanent magnet with a north and south pole is designated by the reference numeral 80 and the stationary armature winding is designated by the reference numeral 60. The armature winding, as in the previous case consists of three windings, A, B, C connected in delta. The end terminals of the armature winding designated by the reference numerals 46, 47, 48 are electrically connected to slip ring brushes 25, 26, 27 instead of the slip rings 28, 29, 30 in the previous system. Except for these changes, the two motor systems of FIG. 6 and FIG. 3 are similar where identical numerals and letters designate identical components. Also, the electrical circuit of the two motor systems are equivalent and therefore the principle of operation of the two motor systems are similar.

It should be noted that this patent description does not cover all secondary components obvious to those skilled in the art and necessary for normal working of the motor systems. These include for example, suppressors for protecting the bridge rectifier diodes and other diodes, inductances to limit fast rise in currents, and other secondary components.

While the embodiments of the present invention as herein disclosed constitutes preferred forms, it is to be understood that other forms might be adopted.

What is claimed is as follows:

1. A separately excited two pole direct current motor system comprising, stationary field windings with first and second terminals, rotating armature, armature windings, commutators and associated stationary brushes, slip rings and associated stationary brushes, a full wave bridge rectifier, said armature windings comprising a three phase winding with first second and third terminals, said commutators comprising first second and third commutator rings and associated first and second sets of stationary commutator brushes, said three commutator rings being mechanically identical each having an electrically conductive segment not exceeding 120° of the commutator ring surface and the rest of the surface being non-conductive, each said conductive segment of said three commutator rings being displaced symmetrically by 120° with respect to the other two segments whereby leading one and lagging the other segment, each said first and second set of commutator brushes comprising a first second and third brushes each said brush resting against a corresponding one of said first second and third commutator rings, said first and second sets of commutator brushes being on diametrically opposite sides of the said commutators and being electrically connected to the positive and negative terminals respectively of a variable dc voltage provided by a fixed voltage source through a voltage controller, said slip rings comprising of first second and third electrically conductive rings and associated first second and third stationary slip ring brushes resting against the corresponding rings, said first second and third end terminals of said armature winding connected respectively to said first second and third commutator segments such that each said winding terminal is electrically conductive with a conducting segment of one of the corresponding said commutator rings, also said first second and third end terminal of said armature winding connected respectively to said first second and third slip rings such that each winding terminal is electrically conductive with one of said three slip rings, said full wave bridge rectifier comprising three pairs of first and second diodes, the anode-cathode junction of each pair of said three pairs of first and second diodes being electrically connected to one of the said three slip ring brushes, the cathode ends of all said three pairs of first and second diodes connected together by a first conductor, the anode ends of all said three pairs of first and second diode connected together by a second conductor, said first conductor connected to the positive terminal of said variable dc voltage source, said second conductor connected to the negative terminal of said variable dc voltage source, said stationary field winding energized separately from said dc voltage source through a field controller.

2. A direct current series two pole motor system comprising, field windings with first and second terminals, field diode, rotating armature, armature windings, commutators and associated stationary brushes, slip rings and associated stationary brushes, a full wave bridge rectifier, said armature windings comprising a three phase winding with first second and third terminals, said commutators comprising first second and third commutator rings and associated first and second sets of stationary commutator brushes, said three commutator rings being mechanically identical each having an electrically conductive segment not exceeding 120° of the commutator ring surface and the rest of the surface being non-conductive, each said conductive segment of said three commutator rings being displaced symmetrically by 120° with respect to the other two segments whereby leading one and lagging the other segment, each said first and second set of commutator brushes comprising a first second and third brushes each said brushes resting against a corresponding one of said first second and third commutator rings, said first and second sets of commutator brushes being on diametrically opposite sides of the said commutators and being electrically connected in series with said field winding to positive and negative terminals of a variable dc voltage source provided by a fixed voltage source through a voltage controller, said positive terminal connected to first terminal of said field winding, second terminal of said field winding connected to said first set of commutator brushes, said second set of commutator brush connected to negative terminal of said variable dc voltage source, said slip rings comprising of first second and third electrically conductive rings and associated first second and third stationary slip ring brushes resting against the corresponding rings, said first second and third end terminals of said armature winding connected respectively to said first second and third commutator segments such that each said winding terminal is electrically conductive with a conducting segment of one of the corresponding said commutator rings, also said first second and third end terminal of said armature winding connected respectively to said first second and third slip rings such that each winding terminal is electrically conductive with one of said three slip rings, said full wave bridge rectifier comprising three pairs of first and second diodes, the anode-cathode junction of each pair of said three pairs of first and second diodes being electrically connected to one of the said three slip ring brushes, the cathode ends of all said three pairs of first and second diodes connected together by a first conductor, the anode ends of all said three pairs of first and second diode connected together by a second conductor, said first conductor connected to the positive terminal of said variable dc voltage source, said second conductor connected to the negative terminal of said variable dc voltage source, cathode and anode of said field diode connected across first and second terminals respectively of said field winding.

3. A permanent magnet field, two pole direct current motor system comprising, permanent magnets to provide the field flux, rotating armature, armature winding, commutators and associated stationary brushes, slip rings and associated stationary brushes, a full wave bridge rectifier, said armature windings comprising a three phase winding with first second and third terminals, said commutators comprising first second and third commutator rings and associated first and second sets of stationary commutator brushes, said three commutator rings being mechanically identical each having an electrically conductive segment not exceeding 120° of the commutator ring surface and the rest of the surface being non-conductive, each said conductive segment of said three commutator rings being displaced symmetrically by 120° with respect to the other two segments whereby leading one and lagging the other segment, each said first and second set of commutator brushes comprising a first second and third brushes, each said brush resting against a corresponding one of said first second and third commutator rings, said first and second sets of commutator brushes being on diametrically opposite sides of the said commutators and being electrically connected to the positive and negative terminals respectively of a variable dc voltage provided by a fixed voltage source through a voltage controller, said slip rings comprising first second and third electrically conductive rings and associated first second and third stationary slip ring brushes resting against the corresponding rings, said first second and third end terminals of said armature winding connected respectively to said first second and third commutator segments such that each said winding terminal is electrically conductive with a conducting segment of one of the corresponding said commutator rings, also said first second and third end terminals of said armature winding connected respectively to said first second and third slip rings such that each winding terminal is electrically conductive with one of the said three slip rings, said full wave bridge rectifier comprising three pairs of first and second diodes, the anode-cathode junction of each pair of said three pairs of first and second diodes being electrically connected to one said three slip ring brushes, the cathode ends of all said three pairs of first and second diodes connected together by a first conductor, the anode ends of all said three pairs of first and second diode connected together by a second conductor, said first conductor connected to the positive terminal of said variable dc voltage source, said second conductor connected to the negative terminal of said variable dc voltage source.

4. The motor system according to claim 1, where additional means are provided for continuous shifting of all said commutator brushes as a total unit to either sides of nominal design axis in order to optimize motor efficiency and performance.

5. A permanent magnet field, two pole direct current motor system comprising, rotating permanent magnets to provide the field flux, stationary armature winding, commutators and associated stationary brushes, slip rings and associated stationary brushes, a full wave bridge rectifier, said stationary armature windings comprising a three phase winding with first second and third terminals, said commutators comprising first second and third rotating commutator rings and associated first and second sets of stationary commutator brushes, said three commutator rings being mechanically identical each having an electrically conductive segment not exceeding 120° of the commutator ring surface and the rest of the surface being non-conductive, each said conductive segment of said three commutator rings being displaced symmetrically by 120° with respect to the other two segments whereby leading one and lagging the other segment, each said first and second set of commutator brush comprising first second and third brushes each said brush resting against a corresponding one of said first second and third commutator rings, said first and second sets of commutator brushes being on diametrically opposite sides of the said commutators and being electrically connected to the positive and negative terminals respectively of a variable dc voltage provided by a fixed voltage source through a voltage controller, said slip rings comprising of first second and third electrically conductive rotating rings and associated first second and third stationary slip ring brushes resting against the corresponding rings, said first second and third conductive rings of of said slip rings connected respectively to said first second and third commutator segments such that each said ring is electrically conductive with conducting segment of one of the corresponding said commutator rings, said first second and third end terminal of said armature winding connected respectively to said first second and third slip ring brushes such that each winding terminal is electrically conductive with one of said three slip rings, said full wave bridge rectifier comprising three pairs of first and second diodes, the anode-cathode junction of each pair of said three pairs of first and second diodes being electrically connected to one of the said three slip ring brushes thus making the anode and cathode of said diode pair also electrically conductive with one corresponding three end terminals of the said stationary armature winding, the cathode ends of all said three pairs of first and second diodes connected together by a first conductor, the anode ends of all said three pairs of first and second diode connected together by a second conductor, said first conductor connected to the positive terminal of said variable dc voltage source, said second conductor connected to the negative terminal of said variable dc voltage source.

* * * * *